US007161914B2

(12) United States Patent
Shoaib et al.

(10) Patent No.: US 7,161,914 B2
(45) Date of Patent: Jan. 9, 2007

(54) CONTEXT AWARE APPLICATION LEVEL TRIGGERING MECHANISM FOR PRE-AUTHENTICATION, SERVICE ADAPTATION, PRE-CACHING AND HANDOVER IN A HETEROGENEOUS NETWORK ENVIRONMENT

(75) Inventors: Shahid Shoaib, San Jose, CA (US); Fujio Watanabe, San Jose, CA (US); Jingjun Cao, Mountain View, CA (US); Shoji Kurakake, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 997 days.

(21) Appl. No.: 10/120,884

(22) Filed: Apr. 11, 2002

(65) Prior Publication Data

US 2003/0193910 A1   Oct. 16, 2003

(51) Int. Cl.
*H04Q 7/00* (2006.01)
*H04Q 7/20* (2006.01)
(52) U.S. Cl. ...................... 370/331; 455/436
(58) Field of Classification Search ........ 370/331–333; 455/436–438
See application file for complete search history.

(56) References Cited

U.S. PATENT DOCUMENTS

| 6,292,496 | B1 * | 9/2001 | Rasanen ................ 370/503 |
| 6,381,472 | B1 * | 4/2002 | LaMedica, Jr. et al. ...... 455/560 |
| 6,631,263 | B1 * | 10/2003 | Corkery ................ 455/436 |
| 6,813,505 | B1 * | 11/2004 | Walley et al. ............ 455/464 |
| 2003/0074329 | A1 * | 4/2003 | Jandasek et al. ............ 705/80 |
| 2005/0195841 | A1 * | 9/2005 | Dowling ................ 370/401 |

FOREIGN PATENT DOCUMENTS

GB   2359220   *  8/2001

OTHER PUBLICATIONS

Newton, Newton's Telecom Dictionary, Oct. 1998, Telecom Books, p. 547.*
U.S. Appl. No. 10/056,938, filed Jan. 25, 2002, Takeshita et al.
U.S. Appl. No. 10/119,558, filed Apr. 10, 2002, Watanabe et al.
U.S. Appl. No. 10/120,164, filed Apr. 10, 2002, Watanabe et al.
K.C. Chen et al., "Software Radio," IEEE Personal Communications, vol. 6, No. 4, Aug. 1999, p. 12.
Juha Kalliokulju et al., "Radio Access Selection for Multistandard Terminals," IEEE Communications Magazine, Oct. 2001, pp. 116-124.
Gang Wu et al., "Wireless Internet over Heterogeneous Wireless Networks," published by IEEE at Globecom '01 Conference, Austin, Texas, Nov. 2001, seven pages.
G. Wu et al., "MIRAI Architecture for Heterogeneous Network," IEEE Commun. Mag., Feb. 2002, pp. 126-134.
"IEEE Std 802.11f/D3.1, Draft Recommended Practice for Multi-Vendor Access Point Interoperability via an Inter-Access Point Protocol Across Distribution Systems Supporting IEEE802.11 Operation," published by IEE, Apr. 2002, pp. 1-43 and 14 additional pages.

(Continued)

*Primary Examiner*—Chi Pham
*Assistant Examiner*—Ronald Abelson
(74) *Attorney, Agent, or Firm*—MacPherson Kwok Chen & Heid LLP

(57) ABSTRACT

A network selection system that includes a mobile terminal in communication with a first network, a second network in communication with the first network and an application layer triggering mechanism that determines which one of a plurality of triggers is required in a certain set of circumstances to provide a particular application.

42 Claims, 3 Drawing Sheets

OTHER PUBLICATIONS

D. Johnson and C. Perkins, "Mobility Support in IPv6," publicly accessible at http://search.ietf.org/internet-drafts/draft-ietf-mobileip-ipv-6-15.txt, , while the first available date at which the website was publicly accessible is unknown, it is believed that the website was publicly accessible prior to Apr. 2002, pp. 1-157.

http://www.ietf.org/html.charters/seamoby-charter.html, while the first available date at which the website was publicly accessible is unknown, it is believed that the website was publicly accessible prior to Apr. 2002.

* cited by examiner

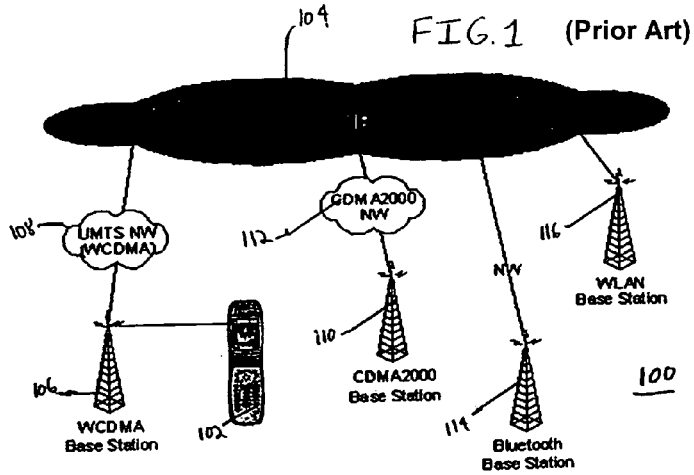
FIG. 1 (Prior Art)
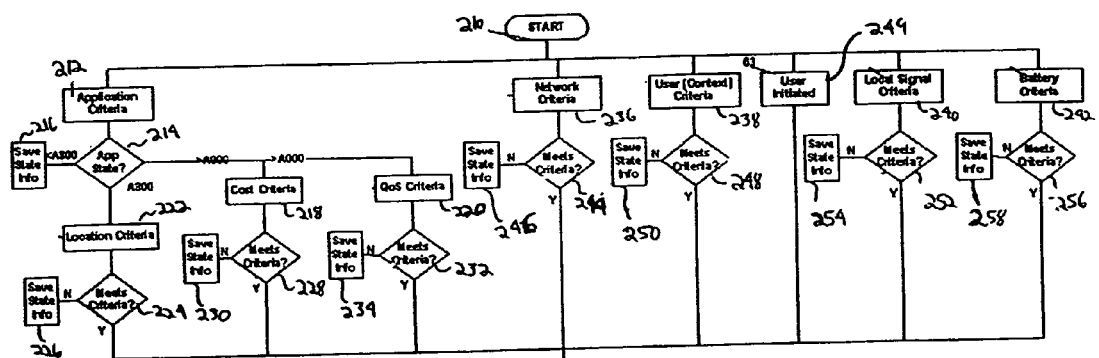
FIG. 2
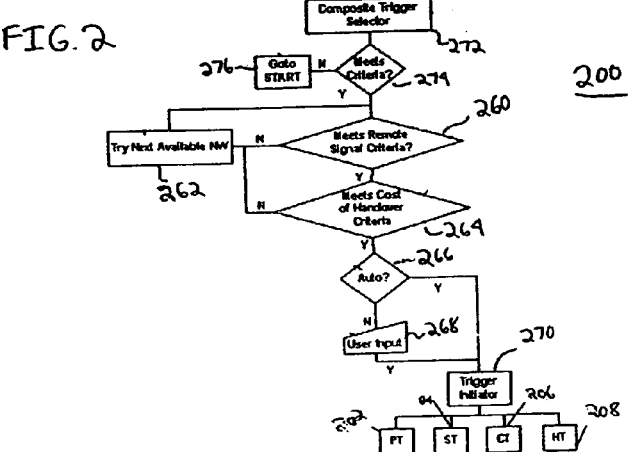

CONTEXT AWARE APPLICATION LEVEL TRIGGERING MECHANISM FOR PRE-AUTHENTICATION, SERVICE ADAPTATION, PRE-CACHING AND HANDOVER IN A HETEROGENEOUS NETWORK ENVIRONMENT

BACKGROUND OF THE INVENTION

1. Field of the Invention

The present invention relates to the field of wireless networks.

2. Discussion of Related Art

The wireless networks of today are homogeneous. There are many different types of wireless networks available today like mobile, such as the networks known as 2.5 G, 3 G etc., wireless LANs, such as the networks known as 802.11 and HIPERLAN, and short range wireless, such as the network known as Bluetooth, etc. However, there is no interoperability between these wireless networks. In other words, the user of one network is not able to seamlessly handover to another type of network. It is envisioned by the present invention that it will be possible in the future to seamlessly handover between heterogeneous networks. In such a heterogeneous environment there is need for mechanisms that allow seamless transition between different networks.

Traditionally, handovers between networks are initiated on the basis of the received signal strength, which is measured at the network and the mobile device. However, the present invention envisions that in the future heterogeneous environment the decision of when and where to handover will most often be made by application layer entities, especially in the case of vertical (intra-access technology) handovers.

In order to support such a seamless environment, the present invention requires mechanisms that allow devices to seamlessly handover between heterogeneous networks and allow services to adapt to changing network conditions. Although the present invention can encompass various techniques to realize the seamless handover, the description of the present invention focuses on the application level triggering mechanisms for seamless mobility.

A typical heterogeneous network environment 100 is schematically shown in FIG. 1. In particular, the network environment includes a mobile terminal, such as a cell phone 102, that is connected to an IP backbone 104 (Internet) through a wireless base station 106 and a Universal Mobile Telecommunications System (as identified in Europe)/WCDMA (as identified in Japan) network 108. In particular, the mobile terminal is first connected to the base station 106, then all traffic generated by the mobile terminal goes to the network 108 and goes out to the Internet. In a heterogeneous environment there will be many different base stations of different access technologies to which the mobile terminal 102 can possibly handover. As shown in FIG. 1, such a heterogeneous environment can include: 1) wireless base station 110 and a CDMA2000 network 112, 2) wireless base station 114 for Bluetooth network and 3) wireless base station 116 for a WLAN (IEEE 802.11A or IEEE 802.11B) network.

While it is possible to initiate the handover processor manually via the mobile terminal, it is preferred that a process is developed where the handover is done automatically. In the case of automatic handover, it is very important for the mobile terminal 102 to know when to do the handover and to which network in a heterogeneous environment such as shown in FIG. 1. It is known that the handover decision can be based on a number of factors. First, information about the network topology and target base stations is required. This may include information about the coverage areas of (geographically) nearby base stations, the type of services supported by the (handover) target base stations, the available bandwidth, available security mechanisms, QoS (Quality of Service) and cost associated with accessing the networks etc. Such information can be made available to the mobile device by a location server that continuously updates this information for base stations in a certain geographical region. It is also possible to determine network topology in the manner described in 1) F. Watanabe etc al., "Using subnet relations to conserve power in a wireless communication device," currently apply to IPR and 2) G. Wu, P. J. M. Havinga, and M. Mizuno, "MIRAI architecture for heterogeneous network," IEEE Commun. Mag., February 2002.

A second factor to consider is that some information is locally available on the mobile device. Such information can include information about the geographical location of the mobile device, signal strength with the current point of attachment, signal strength of the target network, type of applications that are running along with application specific, QoS, bandwidth, security requirements and battery consumption level etc.

A third factor to consider is that user context information is required in order to make effective triggering decisions. This context information will include user preferences for services and networks depending on different factors such as location, time, nearby people, battery resources etc, information about user schedules/agendas, activity e.g. running, walking, driving a car etc and past usage behavior. This context information may be stored locally on the mobile device or it may reside on some database in the network. It should be noted that the Internet Engineering Task Force (IETF) Seamoby working group has proposed an IP level context transfer along the forwarding path of a mobile node in order to provide seamless mobility (see the charter archive maintained by the IETF. In its standardization efforts, Seamoby discusses AAA context transfer between AAA servers as the mobile terminal moves between different IP subnets. In addition, the IEEE802.11 Task Group f has standardized the inter-access point protocol, which will exchange user context information transfer between the new access point (AP) and the old AP (see IEEE Std 802.11f/D2.0, Draft Recommended Practice for Multi-Vendor Access Point Interoperability via an Inter-Access Point Protocol Across Distribution Systems Supporting IEEE802.11 Operation, July 2001). Note that the access point has a station functionality and provides access to the Intranet and the Internet via wireless medium.

A fourth factor is that the user may be running different services on the mobile terminal that need to adapt to the new network conditions. For example, a video conference between two mobile users on a cellular network will have different parameters as compared to a video conference between the same users if they handover to a wireless LAN network. Mobile IP guarantees session continuity but does not provide service adaptability. See the draft proposal by D. Johson and C. Perkins, "Mobility Support in IPv6," available from the archive maintained by the IETF.

A fifth factor is that battery resources are very critical for a handheld device because of limited battery capacity. In the past a number of approaches have been adopted for enhancing battery performance as well as to make the applications themselves battery aware. In a heterogeneous environment there will be a large number of access networks that a mobile device can potentially connect to. Software Defined Radios may be the key enabling technology in providing this type of connectivity. See K. C. Chen, R. Prasad, H. V. Poor, "Software Radio," IEEE Pers. Mag., vol. 6, no. 4, August 1999. The problem is how the mobile device knows when to scan for which access network types.

Based on the above-described systems, there is no technology at this time that can provide seamless handover to other networks in next generation wireless networks.

SUMMARY OF THE INVENTION

One aspect of the present invention regards a method of handing over from a first network to a second network that includes operating a mobile terminal via a first network, evaluating at least one criteria of either the first network or a second network and initiating a trigger that causes a handover from the first network to the second network so that the mobile terminal operates via the second network.

A second aspect of the present invention regards a network selection system that includes a mobile terminal in communication with a first network, a second network in communication with the first network and an application layer triggering mechanism that determines which one of a plurality of triggers is required in a certain set of circumstances to provide a particular application.

Each of the above aspects of the present invention provides the advantage of having a mobile terminal itself acquiring the information required to make an effective handover decision.

Each of the above aspects of the present invention provides the advantage of acting as a triggering mechanism, such as for context transfer mechanisms proposed by the IETF Seamoby working group.

Each of the aspects of the present invention provides the advantage of pre-authenticating a mobile terminal with the target network before the actual handover takes place.

Each of the above aspects of the present invention provides the advantage of authenticating context transfer between the AAA servers of the source/destination networks.

Each aspect of the present invention provides the advantage of allowing running services to adapt to a new network situation.

Each aspect of the present invention provides the advantage of allowing for a trigger for direct pre-caching between the service provider and the nearest cache server or for cache handoff mechanisms.

Each aspect of the present invention provides the advantage of providing a user a more seamless experience by triggering pre-authentication, pre-caching and service adaptability before the actual handover takes place.

Each aspect of the present invention provides the advantage of providing substantial saving of battery resources on a mobile terminal.

The present invention, together with attendant objects and advantages, will be best understood with reference to the detailed description below in connection with the attached drawings.

BRIEF DESCRIPTION OF THE DRAWINGS

FIG. 1 schematically illustrates a possible known heterogeneous environment for operating a mobile terminal;

FIG. 2 shows a flowchart that regards an embodiment of a triggering mechanism according to the present invention;

DETAILED DESCRIPTION OF THE INVENTION

Figure 3:
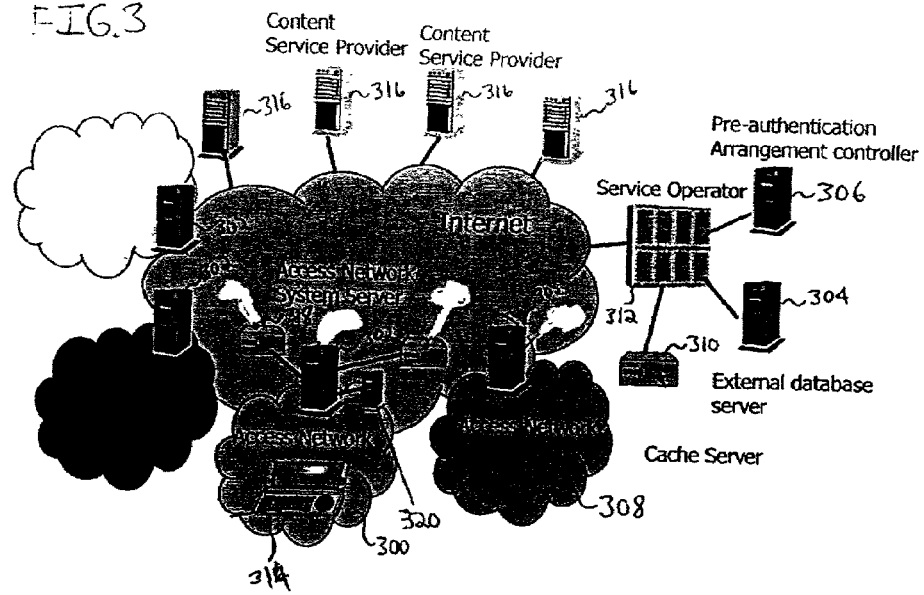
FIG. 3 schematically illustrates an embodiment of an access network according to the present invention.

The following description of the method of the present invention will be with respect to a heterogeneous environment such as the environment 100 shown in FIG. 1. It should be understood that the present invention can be applied to other types of environments as well.

In accordance with the present invention, a mobile terminal, such as a lap top computer, a PDA or the cell phone 102 shown in FIG. 1 is modified so that it acquires network topology information in order to make triggering decisions. Since knowledge of wireless coverage area of a certain network may not necessarily guarantee wireless connectivity due to a number of factors, including multipath fading, congestion and interference, etc., there is a need for error resilience. One way of doing this is to have the mobile device always check the target network signal levels before actually making the handover to the target network.

An algorithm for an application layer triggering mechanism is shown and described in FIG. 2. As will be described below, the application layer triggering mechanism 200 determines which type of trigger is required in a certain set of circumstances and to provide the required trigger to applications.

There are four types of triggers contemplated: 1) a pre-authentication trigger signal 202 (PT) that triggers pre-authentication initiation of the mobile terminal with the handover target network(s), 2) a service adaptability trigger signal 204 (ST) that signals an application that it can perform any necessary adaptation in anticipation of an impending handover, 3) a pre-caching trigger signal 206 (CT) that sends a trigger signal to a cache management system in order to pre-cache content at the cache server nearest to the target base station and 4) a handover trigger signal 208 (HT) that initiates the handover process with the target network.

A certain set of criteria need to be met in order to signal one or more of the above-mentioned trigger signals. This set of criteria corresponds to the many different aspects that need to be considered before making a triggering decision. The triggering mechanism 200 evaluates these criteria in parallel. The results of this evaluation are combined to determine a composite triggering criteria. If the composite triggering criteria are satisfied, then the triggering mechanism 200 checks the remote (target) network signal criteria and if that is also satisfied it may initiate one or more trigger signals with or without user input depending on the situation or pre-defined settings.

In operation, the triggering mechanism 200 is started at step 210 and results in application criteria 212 being defined as the set of application specific conditions that must be met in order to initiate a trigger. Upon defining the set of application specific conditions, the triggering mechanism 200 performs a query at step 214 as to whether a particular application state is present. For example, if the application state corresponds to "No applications running" and designated as A000, then the triggering system saves the state information per step 216. With identification of state A000, pre-authentication, service adaptability and pre-caching triggers are not needed because they are only relevant when an application is running.

In case of an incoming application, either a non realtime application or a real time application, the mobile terminal always connects to the access network, which supports a paging mechanism. Currently, a mobile communication system supports a paging scheme, which ensures that the mobile terminal is always connected to the mobile communication system when it is a dormant mode. Consequently, all incoming applications will reach to the mobile terminal through the mobile communication system, and then an appropriate access network will be selected based on the application requirement described above.

Should the application state be determined to correspond to "Non realtime application running" and designated A100, then other application specific criteria, such as cost criteria 218 and QoS criteria 220 are evaluated in parallel with one another. Should the application state be determined to correspond to "Realtime application running" and designated A300, then the location criteria 222 is also evaluated in parallel with the cost criteria 218 and the QoS criteria 220. Examples of realtime applications are streaming audio/video or audio/visual call, etc.

The location criteria 222 depend on location related information in order to make triggering decision. The location criteria look at such factors as:

Position of the mobile terminal;
Position of the mobile terminal in relation to the coverage area of the current point of attachment;
State of the mobile terminal e.g. stationary or moving;
If moving, then speed and direction of the mobile terminal and whether moving towards the point of attachment or away; and
Position of mobile terminal in relation to (possibly) overlapping coverage areas of other nearby networks.

As shown in FIG. 2, the location criteria 222 is only evaluated when a realtime application is identified. The reason for this is that realtime applications require maximum response time to adapt in order to ensure seamless operation.

For example, if a real-time application is running and the user is moving away from the current point of attachment at a certain speed and is about to reach the limit of wireless coverage for the current point of attachment, then the trigger mechanism 200 can trigger pre-authentication trigger signal 202, service adaptability trigger signal 204 and pre-caching trigger signal 206 should the location criteria be met per step 224. If the location criteria are not met by the real time application, then the application state information will be saved per step 226.

Cost criteria 218 depend on application specific costs associated with different networks. For example, cost criteria 218 may look at such factors as:

Cost of (running) application with current point of attachment; and
Cost of (running) application with other available networks.

The cost criteria 218 is evaluated at step 228 for all running applications, including realtime and non-realtime. The cost criteria 218 is met if an application is cheaper to run on target networks(s) as compared to the current point of attachment. If the cost criteria 218 is not met by the application, then the application state information will be saved per step 230.

QoS criteria 220 depend on application specific QoS information. In reality, QoS information can be constantly changing due to different factors such as the number of users using a network and the type of services being used. For example, a wireless LAN network at an airport will have constantly changing QoS information depending on the number of people using the network and the time of day (e.g. rush hour) etc. In such a scenario, if a handover decision is based on QoS information, and the QoS information suddenly degrades after the handover, it will lead to the mobile device constantly handing over to different networks in search of better QoS information and will lead to a Ping Pong effect. The problem becomes even worse if many mobile devices try to handover based on a QoS information at the same time because it will lead to dramatically changing QoS information based on available networks in that area.

In order to avoid the above-mentioned problems, two possible solutions are employed. First, the target base station can tell the mobile device interested in handover about its best case QoS information, its average QoS information, its worst case QoS information and a measure of the degree of stability of its QoS information. The mobile device can then make its decision based on this information. A second solution is to have the base station support a resource reservation scheme in which bandwidth resources can be reserved for mobile devices that have specific QoS requirements. The mobile devices that make handover decision based on QoS information can be assured of bandwidth availability on the target network.

With the above solutions in mind, the QoS criteria 220 looks at such factors as:

Application specific QoS information at a current point of attachment;
Expected application specific QoS information on other available network(s); and
QoS stability of the target network As shown in FIG. 2, the QoS criteria 220 will be evaluated at step 232 for all running applications, including realtime and non-realtime. The QoS criteria 220 will be met if an application has better QoS information on target networks(s) as compared to the current point of attachment or if the target network has more stable QoS information than the current network. If the QoS criteria 220 is not met by the real time application, then the application state information will be saved per step 234.

As shown in FIG. 2, the trigger mechanism 200 evaluates other criteria, such as network criteria 236, user (context) criteria 238, local signal criteria 240 and battery criteria 242, in parallel with the application criteria 212.

In the case of the network criteria 236, it evaluates the target network for the purpose of handover. Important factors in the network criteria 236 include:

Cost associated with accessing the target network(s) (not application specific);
Operator associations of target network; and
Security schemes and other services provided by the target network.

The network criteria 236 are evaluated in step 244 and are met if the target network(s) are better than the current network. If the network criteria 236 is not met, then the application state information will be saved per step 246.

The user context criteria 238 depend on the user context information. Such user context criteria 238 may look at such factors as:

User location specific service and network preferences;
User general service and network preferences;
User schedule/agenda;
User activity; and
User past behavior.

The user context criteria 238 is such that it is appropriate to select one of the variety of triggers. For example, if the user's preference is to always handover to the high bandwidth network with best QoS when he is using his mobile device for business (e.g. user location is in office, talking to boss etc.) and select the least costly network when the user is using his mobile device for personal use (e.g. user location is in house, user is on vacation etc.), then a network handover trigger and any additional triggers that may be required will be selected if those criteria are met per step 248. How the context information is to be interpreted for making triggering decisions may be decided by the user himself (manually), by the operator depending on past history or any other heuristics. If user (context) criteria 238 are not met, then the application state information will be saved per step 250.

Local signal criteria 240 look at signal strength of the current point of attachment. Some possible signal strength states are: 1) SL000—No signal; 2) SL100—Extremely bad signal; 3) SL200—Poor signal; 4) SL300—Acceptable signal; 5) SL400—Good signal and 6) SL500—Excellent signal. Local signal criteria 240 is evaluated at step 252 and is satisfied when the signal strength with the current point of attachment becomes poor or worst (states <SL300).

The local signal criteria 240 is a qualitative criteria, which is derived from a quantitative criteria that is specific to access technology. For example, a good signal strength is specified by the vender and the operator depending on the wireless system (e.g., 6.1 dB). Note that should the local signal criteria 240 not be met, then the application state information will be saved per step 254.

The battery criteria 242 look at battery usage information in order to make a triggering decision. Battery criteria 242 look at such factors as:

The expected battery resource usage in associating with the current network;
The application specific expected battery resource usage in associating with the current network;
The expected battery resource usage when associating with target network(s); and
The application specific expected battery resource usage when associating with target network(s).

The battery criteria 242 are evaluated at step 256 and satisfied if battery resources can be enhanced by handover to a different network. If the battery criteria 242 are not met, then the application state information will be saved per step 258.

All the criteria 212, 222, 218, 220, 236, 238, 240 and 242 are continuously evaluated and results in the evaluation being sent to the composite trigger selector 272, which determines what type(s) of trigger(s) may be required. Only if the composite trigger selector 272 determines the need for one or more triggers, then a remote signal criteria 260 is applied. This helps in saving battery resources on the mobile device because the mobile device does not have to scan for target networks at all times. In particular, the remote signal criteria 260 look at signal strength of target point(s) of attachment. In the remote signal criteria 260, remote signal states are defined. Examples of such remote signal states are given below:

SR000: No Signal.
SR100: Extremely Bad Signal.
SR200: Poor Signal.
SR300: Acceptable Signal.
SR400: Good Signal.
SR500: Excellent Signal.

The remote signal criteria 260 are satisfied when the signal strength with the target point(s) of attachment is acceptable (states >SR200). The signal criteria described here is a qualitative criteria, which is derived from a quantitative criteria that is specific to access technology.

Should the remote signal criteria 260 not be satisfied, then the next available network will be identified per step 262 and the remote signal criteria 260 will be applied to that network. Should the remote signal criteria 260 be satisfied, then a cost of handover criteria 264 will be applied.

The cost of handover criteria 264 compares the cost of handover in terms of effort required to do the handover versus the advantage of handing over to the new network. This criteria will not be evaluated for user initiated handover requests. This criteria will be effective in cases where the current network and the target network are very similar to each other. For example, if a mobile device is connected to a WCDMA base station of one operator and another WCDMA base station of other operator has slightly better QoS, than this criteria will deny the handover request. If the handover request is denied, then the next available network is identified in step 262 and the remote signal criteria 260 and the cost of handover criteria 264 are applied to the network in the manner described above. If the handover request is accepted in step 264, then it is determined in step 266 whether or not the triggering process should be performed automatically or manually. If the triggering process is to be done manually, then the user initiates handover per step 249 by deciding when and which networks participate in handover. The manual handover input is gathered through some user interface per step 268. In practical systems, the user will most likely be asked for manual selection in case of handover triggers only.

Once the triggering is entered either manually or automatically, the triggering is initiated per step 270 so that either the pre-authentication trigger 202, the service adaptability trigger 204, the pre-caching trigger 206 or the handover trigger 208 is initiated.

Note that the above example regards the situation where all criteria are satisfied. Such a situation will not occur often. Instead, there will often be times when the various criteria are in conflict with each other. Therefore, there is a need for a composite trigger selector 272 that can evaluate the recommendations of the various criteria and determine which triggers are required at that point.

The various criteria evaluators will send their recommendations (in favor or against handover) to the composite trigger selector 272, which will make the final decision based on whether the criteria are met per step 274. If the criteria are not met then the process is returned to step 210 per step 276. As shown in FIG. 2, the composite trigger selector 272 will look at target network signal strength 260 and cost of handover criteria 264 before initiating automatic or manual triggering process.

Table 1 below shows a sample prioritization scheme for different criteria in favor of handover. The criteria priority is a number ranging from 0 to 100 that quantifies the relative importance of a certain criteria and the dependency. The criteria priority is used to resolve conflicts between conflicting criteria. Also some criteria will have more importance than others. Assigning a certain priority to each criterion will help in resolving these conflicts and make correct triggering decisions. Initial values for criteria priorities will be determined by the operator after extensive testing/simulations and statistical analysis. The criteria priority may however, change over time based on user's own preferences or context.

TABLE 1

Criteria prioritization for handover

| No. | Criteria | Criteria Priority | Dependency | Comments |
|---|---|---|---|---|
| 1 | Remote Signal Criteria | 100 | Any of 2, 3, 4, 5, 6, 7, 8, 9, 10 | Must be met for a trigger/handover to occur |
| 2 | User Initiated | 90 | 1 | User may be warned about conflicting criteria e.g. cost, QoS etc. |
| 3 | Cost of Handover Criteria | 80 | 1 | Will not be evaluated for user initiated handover case |
| 4 | Local Signal Criteria | 80 | 1 | |
| 5 | Network Criteria | 70 | 1 | |
| 6 | User Context Criteria | 70 | 1 | |
| 7 | Application Criteria | 60 | 1 | |
| 8 | Cost Criteria | 60 | 1, 6 | |
| 9 | QoS Criteria | 50 | 1, 6 | |
| 10 | Location Criteria | 50 | 1, 6 | |
| 11 | Battery Criteria | 50 | 1 | |

Such prioritization schemes for different criteria will be very dynamic and defined by the operator as well as the user's own preferences and context.

If the handover is user initiated, then the target network signal level is tested to see if it is acceptable. If it is acceptable, then handover to the new network is performed irrespective of other criteria. In all other cases, it is determined whether to stay with the current network or to handover to a new network based on the factor $NAF_{T(i)}$ and $NAF_L$ that are derived from the following formulas:

$$NAF_{T(i)} = \sum_{k=3}^{J} CP_{(k)} \times CF_{(K)} \quad (1)$$

Where:
$NAF_{T(i)}$
Is the Network Attachment Factor for target network 'i'. It is a numerical measure of overall value in attaching with target network 'i'. $NAF_{Ti}$ is calculated for each of the handover target networks and is based on remote network criteria.
$CP_{(k)}$
Is the Criteria Priority for any one of the criteria (k) described in Table 1.
$CF_{(k)}$
Is the Confidence Factor for any of the criteria (k) described in Table 1. $CF_k$ is determined during each criteria evaluation (FIG. 2) and is a numerical measure of the confidence behind each criteria specific recommendation. The method for determination of the Confidence Factor will be criteria specific and is set by the operator. For example, in the case of local and remote signal criteria, the higher the accuracy of signal strength measurement, the higher will be the Confidence Factor. Similarly, in the case of Location criteria, the higher the accuracy of location measurement, the higher will be the Confidence Factor. . . .

$$NAF_L = \sum_{k=3}^{J} CP_{(k)} \times CF_{(K)} \quad (2)$$

Where:
$NAF_L$
Is the Network Attachment Factor for the current network. It is a numerical measure of overall value in remaining attached with the current network and is based on local criteria and so differs from $NAF_{T(i)}$
$CP_{(k)}$
Is the Criteria Priority for any one of the criteria (k) described in Table 1.
$CF_{(k)}$
Is the Confidence Factor for any of the criteria (k) described in Table 1. $CF_k$ is determined during each criteria evaluation (FIG. 2) and is a numerical measure of the confidence behind each criteria specific recommendation.

Assuming there are N handover target networks and $TSF_i$ is the Target Signal Factor for target network 'i' and is a numeric representation of signal strength of target network 'i', the algorithm for handover target selection is as follows:

For i=1 to i=N {If ($NAF_{Ti}$>$NAF_L$) Add to AcceptableTarget[i] list} and sort the Acceptable Target[i] list in descending order, where the higher a network is listed the higher its $NAF_T$ value.

Assuming there are Y acceptable handover target networks, then

For i=1 to i=Y {If(($NAF_{Ti}$×$TSF_i$ for Acceptable Target (i))>$NAF_L$) then do handover and any necessary triggers. In other words, handover is done with the first network to satisfy the equation.

FIG. 3 shows an access network 300 that includes an access network system server 302, external database server 304, pre-authentication arrangement controller 306, network context information database 308 at access network 300, and the cache server 310. The service operator 312, which has contract with different access networks, will own a number of servers, such as the external database server 304, cache server 310, and pre-authentication arrangement controller 306. In addition, these components can be shared with some access networks, content service providers, and service operators.

The pre-authentication arrangement controller 306 will be able to arrange the authentication with different access networks and content service providers before the mobile terminal, such as a lap top computer 314 establishes connection with an access network. Therefore, the pre-authentication arrangement controller 306 will send the user's necessary information to different access networks and content service providers in advance. The cache server 310 will cache current application content/data before the handoff occurs in order to have seamless communications and maintain the quality of service (QoS). The external database server 304 stores access network location map information and network context information. The external database server 304 will correct access network location map information and network context information from its experience, which the external database server 304 handles previous handovers and Mobile IP binding (home agent and foreign agent) information. In addition, the external database server 304 can communicate with different access networks to correct some location and context information. To realize the access network location map, an approximate location map based on the Mobile IP update binding is contemplated based on the article "Method and Associated Apparatus for Location Detection, Paging, Authentication, Association and Activate Access Network in Heterogeneous Access Networks, by F. Watanabe et al., currently apply to IPR and is the subject of U.S. Provisional Patent Application Ser. No. 60/354,568, filed on Feb. 6, 2002, U.S. patent application Ser. No. 10/120,164, filed Apr. 10, 2002, entitled "Using Subnet Relations to Conserve Power in a Wireless Communication Device" and U.S. patent application Ser. No. 10/119,558, filed Apr. 10, 2002, entitled "Using Subnet Relations to Determine Paging Areas in a Wireless Communication Device", the entire contents of each of which is incorporated herein by reference.

Figure 4:
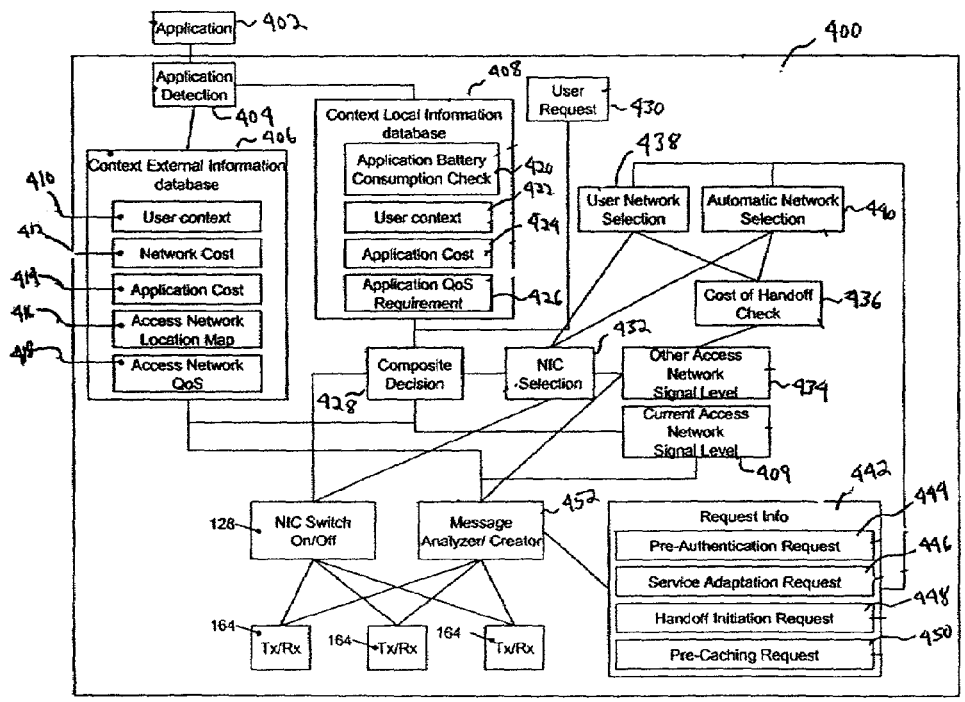
FIG. 4 schematically shows an embodiment of a trigger module component according to the present invention.
Figure 5:
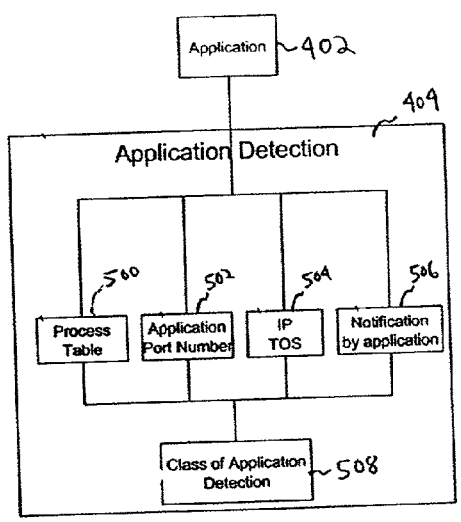
FIG. 5 schematically shows an embodiment of an application detection component according to the present invention to be used with the trigger module component of FIG. 4.
Figure 6:
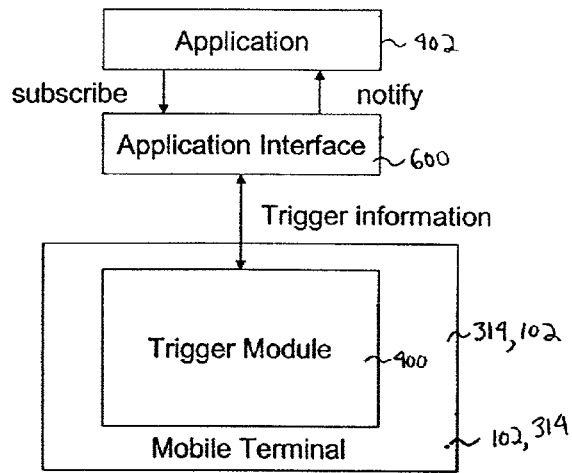
FIG. 6 schematically shows an embodiment of an application interface according to the present invention between the trigger module component of FIG. 4 and an application.

In order to make advance arrangement such as pre-authentication, service adaptation, pre-caching before the handoff, the following process will be performed in a trigger module component 400, as shown in FIG. 4, to make a trigger decision. The trigger module component 400 is located within the mobile device as shown in FIG. 6. The trigger module component 400 first detects what kind of application 402 is running in the mobile device via the application detection component 404. As shown in FIG. 5, the application detection component 404 includes information stored in an operating system process table 500, an application port number 502, an IP type of service (TOS) field 504 and an explicit notification by application 506 itself. Based on this stored information, the kind/class of application, e.g. real time, non-real time, application with QoS requirement is detected per step 508.

After the kind/class of application is detected, triggering criteria are checked from the context external information database 406, the context local/internal information database 408 and the current access network signal level 409 that measures the current active access network signal level. The context external information database 406 stores necessary information, which is obtained from the external database server 304 at the access network shown in FIG. 3. The context external information database 406 includes the user context 410, the network cost 412, the application cost 414, the access network location map 416, and the access network QoS 418. The user context 410 includes user preference, user authentication information, user charging information, and current application requirements. The network cost 412 is the subscribing charging, e.g., price for minimum charge even if there is no usage. The application cost 414 indicates the application specific cost, which can include volume of traffic, packet switch or circuit switch usage fee. The access network location map 416 will give an idea of the terminal location so that the mobile terminal can roughly or exactly know which access network(s) are currently available in the geographical vicinity. The access network QoS 418 indicates the current access network conditions and supported QoS. For example, if the packet delay is large due to high traffic, the access network QoS 418 will give current possible packet delay.

The context local information database 408 will store the mobile terminal information, which is available locally, such as application battery consumption check 420, user context 422, application cost 424, and application QoS requirement 426. The application battery consumption check 420 indicates how much battery the specified application will consume based on the coding, access network card usage, CPU etc. The user context 422 includes the user preference, e.g., which access network is the user's preference, which application is the user's preference, and which method is the user's preference. The application cost 424 indicates the price of application costs when we use. The application QoS requirement 426 indicates what level and what kind of QoS requirement are necessary to support the specified application.

After each criteria is evaluated, recommendations are sent to the composite decision 428 where final evaluation and triggering decisions are made. If the triggering criteria are met, we may make a trigger request to the access network based on the total evaluation. Often, some criteria will be met while others are not. In this case, the composite decision 428 makes a decision to send a trigger request, which is transmitted to an application running on the mobile terminal, the access network, service operator or content service provider etc.

In some cases, the user may initiate the handover request or pre-authentication request, service adaptation request and pre-caching request. These kind of user's explicit requests are handled by the user request 430. After the decision is made at the composite decision 428, the network interface card (NIC), which meets criteria, is selected at the NIC selection 432. One or more NIC can be selected at the NIC selection 432. If the selected NIC does not have enough signal level, other access network signal levels will be checked at the other access network signal level 434. Furthermore, the cost of handoff check 436 will compare the cost of handoff in terms of effort required to do the handoff versus the advantage of handoff to the new access network in a manner described previously. Finally, the user can select which access network (NIC) to use at the user network selection 438.

In concert with the NIC selection 432, a NIC switch off 439 switches on/off the NIC for a particular access network. The switching on/off of the NIC is relayed to the Tx/Rx 441, wherein each Tx/Rx is a transmitter and receiver of packets for different access networks.

Another case is when the user sets up the NIC selection automatically, the automatic network selection 440 will select the best possible access network.

Then, one of the following requests from the request information component 442, decided upon by the composite decision 428, such as pre-authentication request 444, service adaptation request 446, handoff initiation request 448, and pre-caching request 450, will be transmitted to the appropriate destination through the message analyzer/creator 452. The appropriate destination means that pre-authentication request 444 has to be transmitted to the pre-authentication arrangement center 320, for instance. As shown in FIGS. 3 and 6, service adaptation request 446 will be sent to any one of the applications 402 through the application interface 600, the service operator 312, content service provider 316, access network system server 302 or the peer entity depending on which component handles this service adaptation. Handoff initiation request 448 is sent to the access network system server 302 where handoff is handled. In addition, this handoff initiation request 448 may need to be sent to the service operator 312 because the network level handoff has to be arranged. Pre-caching request 450 will be sent to the cache server 310 located in the access network 300 or the service operator 312. At the same time, when the trigger requests are transmitted, the trigger module component 400 will inform the application about this trigger request through application interface 600.

Figure 7:
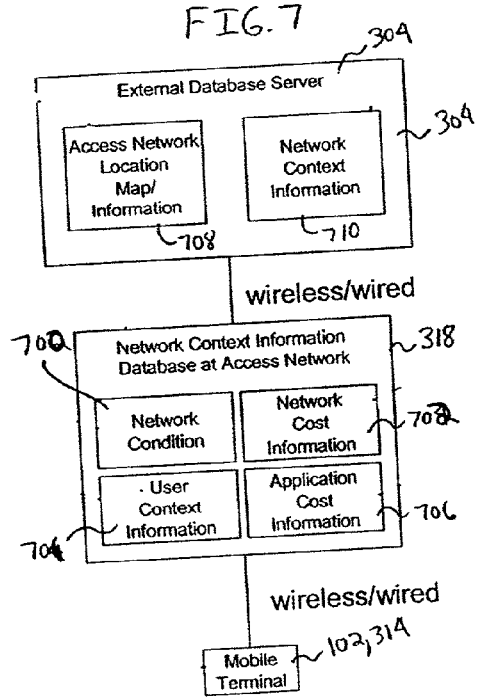
FIG. 7 schematically shows available information at the access network of FIG. 3 and an external database server.

To update the context external information database 406 and the context local information database 408, the mobile terminal, such as cell phone 102 or lap top computer 314, which includes the trigger module component 400, will obtain information from the network context information database 308 at the access network 318 and the external database server 304 located in the service operator 312 shown in FIGS. 3 and 7. The external database server 304 may be located in another place besides the service operator 312.

As shown in FIGS. 3 and 7, the access network 318 includes a network condition 700 that stores the current access network condition such as the number of current active user, possible support QoS level etc. Network cost information 702 stores current access network association costs. User context information 704 stores information related to user, e.g., authentication, usage consist, user preference. Application cost information 706 is the cost information based on the application specific. For instance, price for the specific application includes the price in order to meet QoS and high volume transmission etc.

At the external database server 304, information about access network location map 708 and network context information database 710 is stored. The access network location map 708 has network structure information that is obtained from the access network operator and GPS of mobile terminal. Network context information 710 will include the access network condition information, which contacts with the service operator 312. The mobile terminal, such as cell phone 102 or lap top computer 314, can obtain other/future/target access network context information through the service operator 312 through the current access network.

The foregoing description is provided to illustrate the invention, and is not to be construed as a limitation. Numerous additions, substitutions and other changes can be made to the invention without departing from its scope as set forth in the appended claims.

We claim:

1. A method of handing over from a first network to a second network, comprising:
   operating a mobile terminal via a first network;
   evaluating the handing over based on a state of an application and at least one criteria of either said first network or a second network, when the application is running on the mobile terminal;
   initiating a trigger that causes a handover from said first network to said second network so that said mobile terminal operates via said second network.

2. The method of claim 1, wherein said first network and said second network are each wireless.

3. The method of claim 1, wherein said at least one criteria comprises a location of said mobile terminal relative to said first network and said second network.

4. The method of claim 1, wherein said at least one criteria comprises cost of operation of said mobile terminal within either said first network or said second network.

5. The method of claim 1, wherein said at least one criteria comprises quality of service of either said first network or said second network.

6. The method of claim 1, wherein said at least one criteria comprises a condition of either said first network or said second network.

7. The method of claim 1, wherein said at least one criteria comprises a preference of a user of said mobile terminal of either said first network or said second network.

8. The method of claim 1, wherein said at least one criteria comprises a local signal level received by said mobile terminal.

9. The method of claim 1, wherein said at least one criteria comprises battery consumption by said mobile terminal when using an application.

10. The method of claim 1, wherein said at least one criteria comprises a user indicating a preference for either said first network or said second network via said mobile terminal.

11. The method of claim 10, wherein said at least one criteria does not include cost of handover.

12. The method of claim 1, wherein said trigger comprises a pre-authentication request.

13. The method of claim 1, wherein said trigger comprises a service adaptation request.

14. The method of claim 1, wherein said trigger comprises a precaching request.

15. The method of claim 1, wherein said trigger comprises a handoff initiation request.

16. The method of claim 1, wherein said at least one criteria comprises two or more criteria.

17. The method of claim 16, further comprising forming a composite decision based on said evaluating of said two or more criteria, and wherein said initiating said trigger is based on said composite decision.

18. The method of claim 17, wherein said two or more criteria comprise cost of handover criteria and handoff ping-pong effects that may occur upon handing off from said first network to said second network.

19. The method of claim 17, wherein said composite decision is based in part on current access network signal level information.

20. The method of claim 17, wherein said initiating is based on said composite decision.

21. The method of claim 1, wherein said initiating said trigger is based on access network location map information.

22. The method of claim 1, wherein said trigger comprises a request and if a target access network signal level is satisfied, then said request is initiated.

23. The method of claim 1, further comprising providing a user's authentication information to said second network before said initiating occurs.

24. The method of claim 21, further comprising correcting said access network location map information.

25. The method of claim 24, further comprising correcting network context information.

26. The method of claim 1, further comprising caching current application content and data before said initiating occurs.

27. A network selection system comprising:
   a mobile terminal in communication with a first network;
   a second network in communication with said first network;
   an application layer triggering mechanism that determines which one of a plurality of triggers is required in a certain set of circumstances to trigger a handover of the mobile terminal from communication with the first network to a communication with the second network based on a state of a particular application running on the mobile terminal.

28. The network selection system of claim 27, further comprising: an internet network that is in communication with said first network and said second network; a service operator in communication with said internet network, said service operator comprises: a pre-authentication arrangement controller; a cache server; and a pre-authentication arrangement controller.

29. The network selection system of claim 28, wherein said pre-authentication arrangement controller arranges for authentication with said first and second networks and content service providers, before said mobile terminal establishes connection with said second network.

30. The network selection system of claim 28, wherein said cache server caches current application content/data before handoff to said second network occurs in order to have seamless communications and maintain the quality of service.

31. The network selection system of claim 28, wherein said external database server stores access network location map information and network context information.

32. The network selection system of claim 27, wherein said mobile device comprises a trigger module component that checks triggering criteria and comprises an application detection component that detects an application that is running.

33. The network selection system of claim 32, wherein said application detection component comprises: an operating system process table; an application port number; an IP type of service field; and an explicit notification by application.

34. The network selection system of claim 32, wherein said trigger module component further comprises: a context external information database; a context local/internal information database; and a current access network signal level that measures a current active access network signal level.

35. The network selection system of claim 34, wherein said context external information database consists of information selected from the group consisting of user context, network cost, application cost, access network location map or access network QoS.

36. The network selection system of claim 34, wherein said context local/internal information database consists of information selected from the group consisting of application battery consumption check, user context, application cost or application QoS requirement.

37. The network selection system of claim 27, wherein said plurality of triggers comprises a pre-authentication trigger signal that triggers pre-authentication initiation of said mobile terminal with said second network.

38. The network selection system of claim 27, wherein said plurality of triggers comprises a service adaptability trigger signal that signals an application that it can perform any necessary adaptation in anticipation of an impending handover to said second network.

39. The network selection system of claim 27, wherein said plurality of triggers comprises a pre-caching trigger signal that sends a trigger signal to a cache management system in order to pre-cache content at a cache server nearest said second network.

40. The network selection system of claim 27, wherein said plurality of triggers comprises a handover trigger signal that initiates a handover process with said second network.

41. The network selection system of claim 27, wherein said mobile terminal comprises a cell phone.

42. The network selection system of claim 27, wherein said mobile terminal comprises a lap top computer.

* * * * *